United States Patent
Liu et al.

(10) Patent No.: US 6,476,995 B1
(45) Date of Patent: Nov. 5, 2002

(54) METHOD AND APPARATUS FOR REDUCING TRACK MISREGISTRATION FROM SERVO TRACK WRITING

(75) Inventors: Xiong Liu, Singapore (SG); Joseph Cheng-Tsu Liu, Singapore (SG); Kevin A. Gomez, Singapore (SG); Choonkiat Lim, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/483,525

(22) Filed: Jan. 14, 2000

Related U.S. Application Data (60) Provisional application No. 60/115,970, filed on Jan. 15, 1999.

(51) Int. Cl.[7] ............................ G11B 21/02; G11B 5/596
(52) U.S. Cl. .................. 360/75; 360/77.03; 360/78.04; 360/78.11
(58) Field of Search ............... 360/70, 75, 77.02, 360/77.03, 77.04, 99.08, 31, 78.04, 78.11; 369/53.14, 44.32

(56) References Cited

U.S. PATENT DOCUMENTS

| | | | |
|---|---|---|---|
| 4,458,280 A | 7/1984 | Cunningham et al. ...... 360/125 |
| 4,589,037 A | 5/1986 | Jen et al. |
| 4,920,442 A | 4/1990 | Dimmick .................... 360/137 |
| 4,980,783 A | 12/1990 | Moir et al. |
| 5,559,648 A | 9/1996 | Hunter et al. ................ 360/75 |
| 5,570,241 A | 10/1996 | Nielson et al. ............... 360/46 |
| 5,570,247 A | 10/1996 | Brown et al. ................ 360/75 |
| 5,592,349 A | 1/1997 | Morehouse et al. |
| 5,617,267 A | 4/1997 | Kawagoe et al. |
| 5,694,267 A | 12/1997 | Morehouse et al. |
| 5,771,130 A | 6/1998 | Baker .......................... 360/75 |
| 5,774,294 A | 6/1998 | Fioravanti .................... 360/75 |
| 5,793,554 A | 8/1998 | Chainer et al. .............. 360/75 |
| 5,825,578 A | 10/1998 | Shrinkle et al. |
| 5,892,635 A | 4/1999 | Morita .................... 360/77.02 |
| 5,903,408 A | 5/1999 | Omi |
| 5,923,491 A | 7/1999 | Kisaka et al. |
| 5,949,603 A | 9/1999 | Brown et al. ................. 360/75 |
| 5,966,263 A | 10/1999 | Freitas et al. ................. 360/69 |
| 6,315,452 B1 * | 11/2001 | Titcomb .................. 360/86 X |
| 2002/0044370 A1 * | 4/2002 | Min et al. ..................... 360/31 |

FOREIGN PATENT DOCUMENTS

| JP | 08306125 | 11/1996 |
|---|---|---|
| JP | 09091906 | 4/1997 |

\* cited by examiner

*Primary Examiner*—Andrew L. Sniezek
(74) *Attorney, Agent, or Firm*—Mitchell K. McCarthy (57) ABSTRACT

An HDA includes a base, a disc stack coupled to a spindle rotatably attached to the base by a spindle shaft and spindle bearing. An actuator assembly is pivotally attached to the base at a pivot shaft. Attached to one end of the actuator assembly proximal the disc stack is one or more transducers for reading/writing information from/to the discs. A servo writer includes a controller for moving the actuator during the servo writing process. The controller moves the servo writer at the cage frequency of the spindle bearing to lessen the relative motion between the transducer head and the disc as the servo information is written to the disc. The controller also may be programmed to move the transducer at both the spindle rotation frequency and the cage frequency of the spindle bearing to lessen the relative motion between the transducer and the disc during the servo writing process.

19 Claims, 9 Drawing Sheets

METHOD AND APPARATUS FOR REDUCING TRACK MISREGISTRATION FROM SERVO TRACK WRITING

RELATED APPLICATION

This application claims the benefit under 35 U.S.C. 119(e) of U.S Provisional Application Ser. No. 60/115,970, filed Jan. 15, 1999.

FIELD OF THE INVENTION

The present invention relates to the field of mass storage devices. More particularly, this invention relates to an improved apparatus and method for writing servo information to the disc of a high density disc drive.

BACKGROUND OF THE INVENTION

One key component of any computer system is a device to store data. Computer systems have many different places where data can be stored. One common place for storing massive amounts of data in a computer system is on a disc drive. The most basic parts of a disc drive are a disc drive housing, a disc that is rotated, an actuator assembly that moves a transducer to various locations over the disc, and electrical circuitry that is used to write and read data to and from the disc. The disc drive also includes circuitry for encoding data so that it can be successfully retrieved and written to the disc surface. A microprocessor controls most of the operations of the disc drive as well as passing the data back to the requesting computer and taking data from a requesting computer for storing to the disc.

To read and write data to the disc drive, the actuator assembly includes one or more arms that support the transducer over the disc surface. The actuator assembly is selectively positioned by a voice coil motor which pivots the actuator assembly about a pivot shaft secured to the drive housing. The disc is coupled to a motorized spindle which is also secured to the housing. During operation, the spindle provides rotational power to the disc. By controlling the voice coil motor, the actuator arms (and thus the transducers) can be positioned over any radial location along the rotating disc surface.

The transducer is typically placed on a small ceramic block, also referred to as a slider, that is aerodynamically designed so that it flies over the disc. The slider is passed over the disc in a transducing relationship with the disc. Most sliders have an air-bearing surface ("ABS") which includes rails and a cavity between the rails. When the disc rotates, air is dragged between the rails and the disc surface causing pressure which forces the head away from the disc. At the same time, the air rushing past the cavity or depression in the air bearing surface produces a negative pressure area. The negative pressure or suction counteracts the pressure produced at the rails. The slider is also attached to a load spring which produces a force on the slider directed toward the disc surface. The various forces equalize so the slider flies over the surface of the disc at a particular desired fly height. The fly height is the distance between the disc surface and the transducing head, which is typically the thickness of the air lubrication film. This film eliminates the friction and resulting wear that would occur if the transducing head and disc were in mechanical contact during disc rotation. In some disc drives, the slider passes through a layer of lubricant rather than flying over the surface of the disc.

Information representative of data is stored on the surface of the storage disc. Disc drive systems read and write information stored on portions of the storage disc referred to as tracks. Transducers, in the form of read/write heads attached to the sliders, located on both sides of the storage disc, read and write information on the storage discs when the transducers are accurately positioned over one of the designated tracks on the surface of the storage disc. As the storage disc spins and the read/write head is accurately positioned above a target track, the read/write head can store data onto the track by writing information representative of data onto the storage disc. Similarly, reading data on a storage disc is accomplished by positioning the read/write head above a target track and reading the stored material on the storage disc. To write to or read from different tracks, the read/write head is moved radially across the tracks to a selected target track. The data is often divided between several different tracks. While most storage discs utilize a multiplicity of concentric circular tracks, other discs have a continuous spiral forming a single track on one or both sides of the disc.

During manufacturing, servo information is encoded on the disc and subsequently used to accurately locate the transducer. The written servo information is used subsequently to locate the actuator assembly/transducer head at the required position on the disc surface and hold it very accurately in position during a read or write operation. The servo information is written or encoded onto the disc with a machine commonly referred to as a servo track writer (hereinafter STW). At the time the servo information is written, the disc drive is typically at the "head disk assembly" (hereinafter HDA) stage. The HDA includes most of the mechanical drive components but does not typically include all the drive electronics. During the track writing process, the STW precisely locates the transducer heads relative to the disc surface and writes the servo information thereon. Accurate location of the transducer heads is necessary to ensure that the track definition remains concentric. If the servo track information is written eccentrically, the position of the transducer head during subsequent operation will require relatively large, constant radial adjustments in order to maintain placement over the track center. When the tracks are sufficiently eccentric, a significant portion of the disk surface must be allotted for track misregistration.

The offset between the actual head position and the track center is called the track misregistration. Track misregistration has two aspects, referred to as write-to-write track misregistration and write-to-read track misregistration. The write-to-write track misregistration is the misregistration between a recorded track and an adjacent track, which can result in track-to-track squeeze. The write-to-read track misregistration is the misregistration between the centerline of recorded track and the actual read head position. The misregistration is induced during servo track writing where any relative movement between the head and media in the radial direction will result in imperfect tracks written. The imperfect tracks written can cause adjacent tracks to position themselves closer than intended at certain locations on the media which gives rise to track squeeze. Also, such relative motion of the head to media is not synchronous to the rotation of the disc, i.e., spindle. Thus, the relative radial position of the head at the start of a track write will shift by the time it reaches the end of the track write. This leads to a discontinuity in the radial direction of the servo track. The squeeze and discontinuity contributes to what is known as written-in repeatable runout (STWRRO) in the servo track.

In order to ensure proper writing of servo information, STWs utilize an external, closed loop positioning system that precisely positions the transducer head during servo track writing. The positioning system comprises a contact member that engages the actuator assembly, a position indicator which indicates the position of the contact member, and a displacing mechanism which repositions the contact member based on feedback from the position indicator. To ensure accurate positioning, various position indicators are used (e.g., mechanical, capacitive, and optical transducers to name a few). The STW further includes the required circuitry for writing the servo information to the disc surface via the transducer heads.

While it is advantageous to maintain substantial concentricity during the servo track writing process, many factors adversely impact the STW's ability to write servo information concentrically. As mentioned previously, servo track written repeatable runout occurs when relative motion occurs between the servo writing head and the media. One major contributor to the relative motion between the head and media is from the vibration of the spindle which is also known as the non-repeatable runout (NRRO). The NRRO is non-synchronous to the spindle rotation but is periodic. The major contributor to the NRRO is the cage rotation or ball train; thus, a periodic waveform is found. This wave will not be synchronized to the spindle but nevertheless repeats itself at intervals longer than one spindle rotation. In short, vibrations in the spindle or actuator components due to imperfect bearings is one major factor in producing non-repeatable track writing errors.

As a result of servo written non-repeatable runout, the overall track density achievable is reduced since there must be a "budget" for track misregistration. As a result, a track misregistration budget must be used to account for track misregistration or allow track squeeze to occur. Many factors contribute to the track misregistration problem, but it will be appreciated tat reducing servo track written repeatable runout will allow the reduce the overall track misregistration budget and allow for an increase in overall track density and an increase in disc drive capacity.

As demand for higher capacity drives grows, manufacturers are constantly seeking to increase drive capacity by increasing track density. That is, by increasing the density or "tracks per inch" (TPI), a greater number of discreet tracks can be encoded on a given disc surface. However, higher track density requires more efficient use of the disc surface. Accordingly, track misregistration due to eccentricities in track formation must be minimized in order to maximize TPI (and thus disc capacity).

Accordingly, what is needed is an apparatus and method for use with an STW that minimizes relative motion between the head of the servo writer and the disc. This will, in turn, reduce the servo track written repeatable runout and track squeeze which will in turn reduce the overall track misregistration (TMR) budget so that tracks may be more closely spaced. In particular, what is needed is a way to reduce non-repeatable run out caused by motion between the head and a given disk surface. What is also needed is a method wad apparatus which can reduce non-repeatable run out using Current manufacturing methods.

SUMMARY OF THE INVENTION

The present invention is directed to reducing these problems, especially the non-repeatable track writing errors due to imperfect bearings. A servo track writer for writing servo information to a head disc assembly includes a mounting fixture for mounting a head disc assembly. The head disc assembly includes a disc attached to a base with a spindle bearing, and a rotary actuator adjacent the disc. The actuator includes a read/write head for selectively magnetizing the disc. The mounting fixture provides a mechanical reference for the servo track writer as servo information is written to the head disc assembly. The servo track writer also includes a pusher block assembly mounted to the mounting fixture proximate the actuator of the head disc assembly. The pusher block assembly mechanically positions the actuator. The servo track writer also includes a position control system for controlling the position of the actuator. The position control system further includes a motor connected to the pusher block assembly, and a controller for outputting control signals to the motor in order to adjust the position of the actuator with respect to the disc. The controller synchronizes the motion of the actuator to a cage frequency of the spindle bearing. The position control system may further have a sensor for monitoring the cage frequency of the spindle bearing of the head disc assembly.

The controller selects the time to start servo writing in response to the cage frequency of the spindle bearing. The position control system of the servo track writer may also include a detector for determining the position of the actuator and outputting control signals to the motor in order to adjust the position of the actuator in response to the detected position of the actuator and a desired position of the actuator.

The controller for outputting control signals to the motor may synchronize to the spindle rotation frequency in addition to the spindle bearing cage frequency. The servo track writer may also have a sensor for monitoring the cage frequency of the spindle bearing of the head disc assembly. The servo track writer which synchs to both the spindle rotation frequency and the spindle bearing cage frequency may also have a sensor for monitoring the cage frequency of the spindle bearing of the head disc assembly. The controller selects the time to start servo writing in response to the cage frequency of the spindle bearing. The servo track writer further includes a detector for determining the position of the actuator and outputting control signals to the motor in order to adjust the position of the actuator in response to the detected position of the actuator and a desired position of the actuator.

Also disclosed is a method for writing servo patterns to a disc drive which includes at least one disc mounted on a spindle with a spindle bearing, the at least one disc mounted for rotation about an axis. The disc drive also includes an actuator for moving each of at least one transducer relative to an associated at least one disc. The transducer reads and writes information to the associated disc. The servo writer includes a linkage for controllably moving the actuator during servo writing. The method for writing servo patterns includes collecting spindle run out data, determining a spindle bearing cage frequency from the collected data, and moving the linkage of the servo writer to synchronize movement of the actuator to the spindle bearing cage frequency. Determining a spindle bearing cage frequency further includes calculating the spindle bearing cage frequency. The linkage of the servo writer is moved to synchronize movement of the actuator to the spindle bearing cage frequency. This includes generating run out at the spindle bearing cage frequency, and calculating the phase of the spindle bearing cage frequency. The movement of the linkage of the servo writer may also include timing the initial movement of the linkage of the servo writer to start the servo write process based on the phase of the spindle bearing cage frequency. The timing is based on measuring the phase at the spindle cage frequency or upon predicting the phase at the spindle cage frequency. The timing of the initial movement of the linkage of the servo writer to start the servo write process based on the phase of the spindle bearing cage is selected when the spindle bearing cage frequency is at the minimum.

The method for writing servo patterns to a disc drive may further include the step of determining a spindle frequency, and using the spindle frequency in addition to the bearing cage frequency to synchronize movement of the actuator the spindle bearing cage frequency aid to synchronize movement to the spindle frequency. Determining a spindle bearing cage frequency from the collected data further includes calculating the spindle bearing cage frequency.

Advantageously, the method and apparatus of the present invention produces disc drives with higher storage capacity than those drives produced by other servo writing methods/apparatuses. In particular, the instant invention permits precise, concentric writing of servo information to the disc. This reduces the servo track written repeatable run out and reduces the overall TMR budget so that tracks may be more closely spaced. Allowing tracks to be more closely spaced allows for the higher storage capacity of the disc drive. Advantageously, the method and apparatus reduce non-repeatable run out using current manufacturing apparatus and methods.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
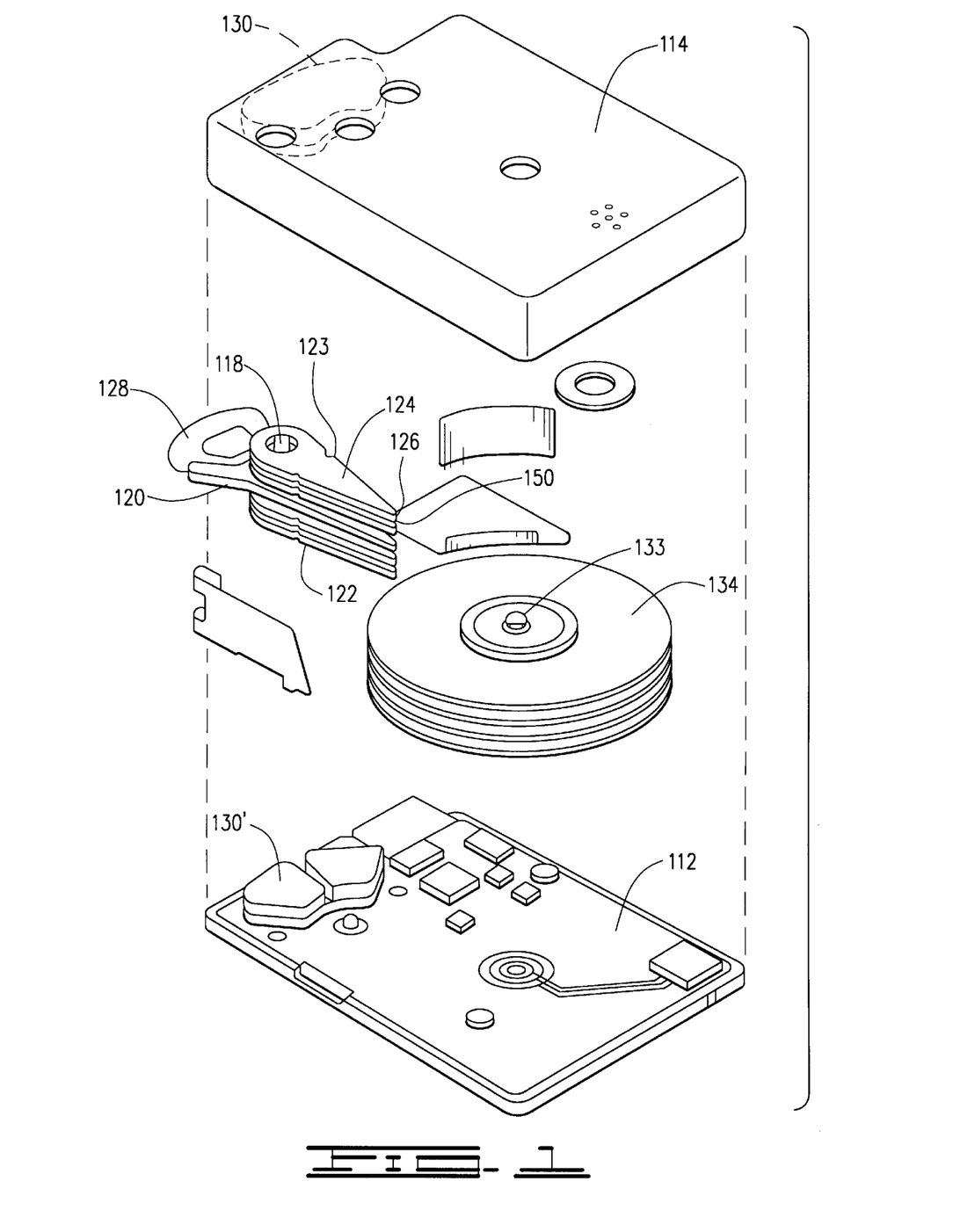
FIG. 1 is an exploded view of a disc drive with a multiple disc stack.

The invention described in this application is useful with most all mechanical configurations of disc drives utilizing either rotary or linear actuation. FIG. 1 is an exploded view of one type of a disc drive 100 having a rotary actuator. the disc drive 100 includes a housing or base 112, and a cover 114. The housing 112 and cover 114 form a disc enclosure. Rotatably attached to the housing 112 on an actuator pivot shaft 118 is an actuator assembly 120. The actuator assembly 120 includes a comb-like structure 122 having a plurality of arms 123. Attached to the separate alms 123 on the comb 122 are load beams or load springs 124. Load beams or load springs are also referred to as suspensions. Attached at the end of each load spring 124 is a slider 126 which carries a magnetic transducer head 150. The slider 126 with the transducer 150 form what is frequently called the head. It should be noted that many sliders have one transducer 150 and that is what is shown in the figures. However, this invention is equally applicable to sliders having more than one transducer, such as what is referred to as an MR or magneto resistive head in which one transducer 150 is generally used for reading and another is generally used for writing.

On the end of the actuator assembly 120 opposite the load springs 124 and the sliders 126 is a voice coil 128. Located above and below the voice coil 128 is a first magnet 130 and a second magnet 131. As shown in FIG. 1, the first magnet 130 is associated with the cover 114 while the second magnet is adjacent the housing 112. The first and second magnets 130, 131, and the voice coil 128 are the key components of a voice coil motor which applies a force to the actuator assembly 120 to rotate it about the actuator pivot shaft 118. Also mounted to the housing 112 is a spindle motor (not shown). The spindle motor includes a rotating portion called the spindle hub 133. In this particular disc drive, the spindle motor is within the hub. In FIG. 1, a number of discs 134 are attached to the spindle hub 133. In other disc drives, a single disc or a different number of discs may be attached to the hub. The invention described herein is equally applicable to disc drives which have a plurality of discs as well as disc drives that have a single disc. The invention described herein is also equally applicable to disc drives with spindle motors which are within the hub 133 or, alternatively, under the hub.

The disk drive 100 includes the mechanical components discussed above as well as various electronic components such as a printed circuit board (not shown) typically attached to the lower (as viewed in FIG. 1) side of the housing 112. Without the circuit board and other electronics, the disc drive is often referred to as a head disc assembly or HDA 152. Stated alternatively, the mechanical components, including the drive housing 112, cover 114, actuator assembly 120, pivot shaft 118, arms 123, transducer heads 150, spindle hub 133, spindle shaft 138, and discs 134 among others generally define the HDA 152. The HDA is a convenient sub-assembly for completing various manufacturing processes including servo track writing. For instance, the HDA provides physical access to the voice coil 128 during manufacture via apertures 136 but can thereafter be sealed (hermetically if necessary) to ensure that the internal components remain substantially contaminant-free. Near the end of production, the drive electronics arc assembled to the HDA 152 to produce the disc drive 100.

Figure 2:
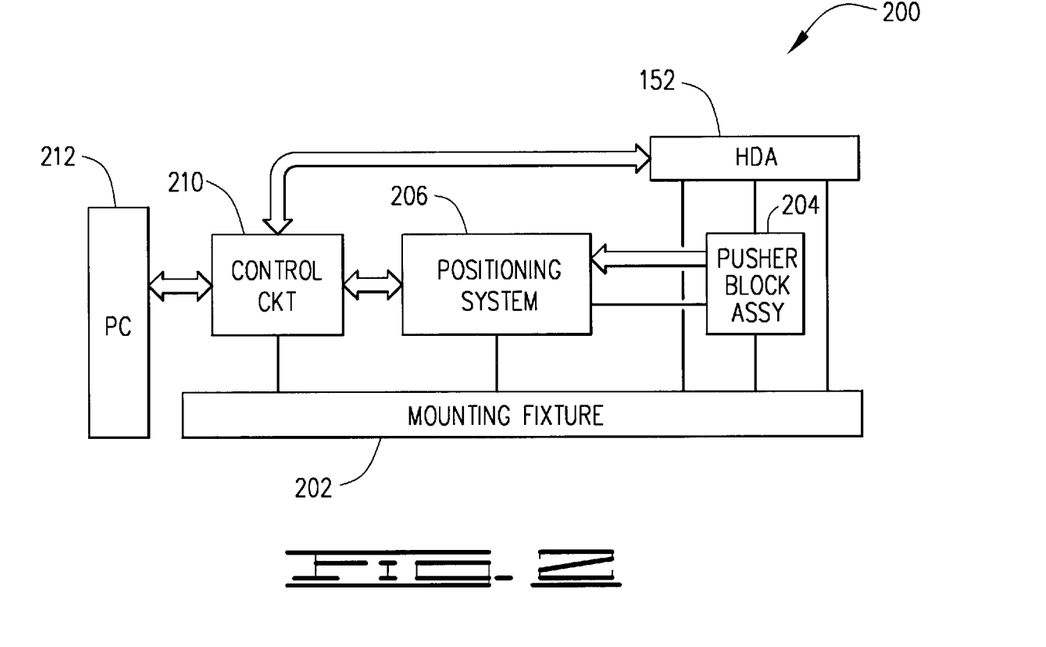
FIG. 2 is a schematic representation of a servo track writer used to write the servo information to the discs of the head disc assembly of FIG. 1.

Referring now to FIG. 2, shown therein is a schematic representation of a servo track writer 200, constructed in accordance with the preferred embodiment of the present invention. As discussed below, the servo track writer 200 serves to write the servo information to the discs 134 (shown in FIG. 1) during manufacturing of the HDA 152.

As shown in FIG. 2, the HDA 152 is mounted over a mounting fixture 202 which serves as a mechanical reference for the servo track writer 200. The mounting fixture 202 typically comprises a granite block (not separately designated in FIG. 2) having a calibrated, level top surface on which a mounting plate (also not separately designated in FIG. 2) is placed. The mounting plate includes clamps (not shown) which locate and secure the HDA 152 to the mounting fixture 202. As such mounting fixtures 202 are well known, additional discussion will not be provided herein except to state that the HDA 152 is mounted in such a manner so as to provide access to the E-block of the actuator assembly 120 (shown in FIG. 1) by the servo track writer 200 during a servo write operation.

Continuing with FIG. 2, a pusher block assembly 204 is also mounted to the mounting fixture 202 underneath the HDA 152 so as to engage the actuator assembly 120 of the HDA 152 in order to selectively position the actuator assembly 120 relative to the discs 134. Typically an opening (not shown) is provided in the bottom of the deck or base 112 (shown in FIG. 1) of the HDA 152 so that the pusher block assembly 204 can access the internal environment of the HDA 152 by extending up through the opening in tile deck or base 112. Once the servo information is written, the opening is typically covered by an adhesive label or other means to seal the internal environment of the HDA. Further, it will be recognized that, as actuator assemblies (such as shown at 120 in FIG. 1) typically include a mechanical bias either towards the inner or the outer diameter of the discs 134, the pusher pin engages the actuator against this bias and exerts a horizontal force upon the actuator. Thus, it is unnecessary to mechanically secure the pusher block assembly 204 to the actuator assembly 120; instead, the existing bias of the actuator assembly is typically used to ensure contact is maintained between the pusher block assembly 204 and the actuator assembly 120.

Moreover, the servo track writer 200 further comprises a conventional positioning system 206 which rotates the pusher block assembly 204 about a central axis (not shown in FIG. 2, for purposes of clarity) in order to advance the position of the actuator assembly 120. The position of the pusher block assembly 204 is controlled by the positioning system 206 through detection means (not separately shown) which detects the position of the pusher block assembly 204 and provides correction signals to a motor (also not separately shown) of the positioning system 206 in order to rotate the pusher block assembly 204 accordingly. In the preferred embodiment, the positioning system 206 comprises a laser based, closed loop positioner utilizing a laser and appropriate sensors to detect the position of the pusher block assembly 204, although it will be recognized that other types of positioning systems can be used. One such laser based positioning system is model 137K15, manufactured by Teletrak Inc. As will be recognized, the positioning system 206 is mounted to the mounting fixture 202 relative to the HDA 152.

Continuing with FIG. 2, the servo track writer 200 is further shown to include a control circuit 210 which interfaces with a personal computer (PC) 212 and controls the operation of the servo track writer 200 and the HDA 152 during a servo write operation, including the transfer of the servo information to the HDA 152 from the PC 212.

During operation of the servo track writer 200 to write the servo information to the HDA 152, a user mounts the HDA 152 to the mounting fixture 202 and instructs the servo track writer 200 (by way of the PC 212) to commence writing the servo information to the HDA 152. As a result, the controller circuit 210 instructs the HDA 152 to commence rotation of the discs 134 by way of the spindle motor 16 (shown in FIG. 1) and instructs the pusher block assembly 204 to place the actuator assembly 20 at a starting position (typically near the outer diameter of the discs 134). The servo track writer 200 will thereafter instruct the HDA 152 to write the servo information to each of the surfaces of the discs 134, while mechanically advancing the pusher block assembly 204 so as to define each new successive track on the discs 134. For dedicated servo systems, the entire surface of one of the discs 134 will receive the servo information, written by the corresponding servo head 150 (shown in FIG. 1). For embedded servo systems, each of the heads 150 in turn will write the servo information to the corresponding discs at the appropriate locations.

The time required to write the servo information to a typical HDA depends upon the amount of servo information to be written to the discs, the rotational speed of the discs 134 and the number of discs 134, but for purposes of reference, it may take the servo track writer 200 as much as 30 minutes to complete the servo write operation. Typically, the servo write operation requires a relatively significant amount of time in a large scale disc drive manufacturing operation wherein thousands of disc drives are manufactured each day. Hence, the importance of correctly writing the servo information to the HDA 152 will be recognized, as the time required to rewrite servo information to a population of drives can be extensive. Although servo track writers 100 typically perform some level of testing of the servo information, frequencies in the PES may not be detected until subsequent manufacturing operations when the PCB is mated with the HDA 152 and system level testing of the disc drive is performed.

Figure 3:
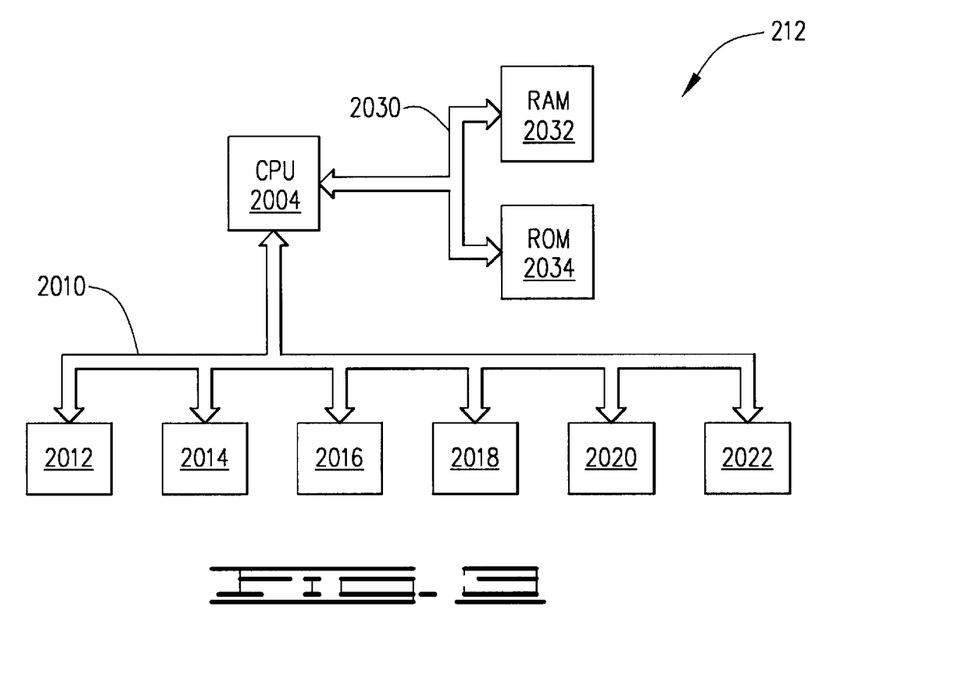
FIG. 3 is a schematic view of the personal computer used as part of the servo track writer.

FIG. 3 is a schematic view of a computer system, such as the personal computer 212 shown in FIG. 2. The computer system 2000 ray also be called an electronic system or an information handling system or a controller and includes a central processing unit, a memory aid a system bus. The information handling system includes a central processing unit 2004, a random access memory 2032, and a system bus 2030 for communicatively coupling the central processing unit 2004 and the random access memory 2032. The information handling system 2002 is attached to the HDA 152 attached to the servo writer 200. The information handling system 2002 may also include an input/output bus 2010 and several devices peripheral devices, such as 2012, 2014, 2016, 2018, 2020, and 2022 may be attached to the input output bus 2010. Peripheral devices may include hard disc drives, magneto optical drives, floppy disc drives, monitors, keyboards and other such peripherals. The personal computer 212 is used as a controller for the servo writer 200. The personal computer 212 may receive data and output control signals for moving the actuator 120 of the HDA 152 The personal computer 212 is used to perform operations on the data input thereto.

Figure 4:
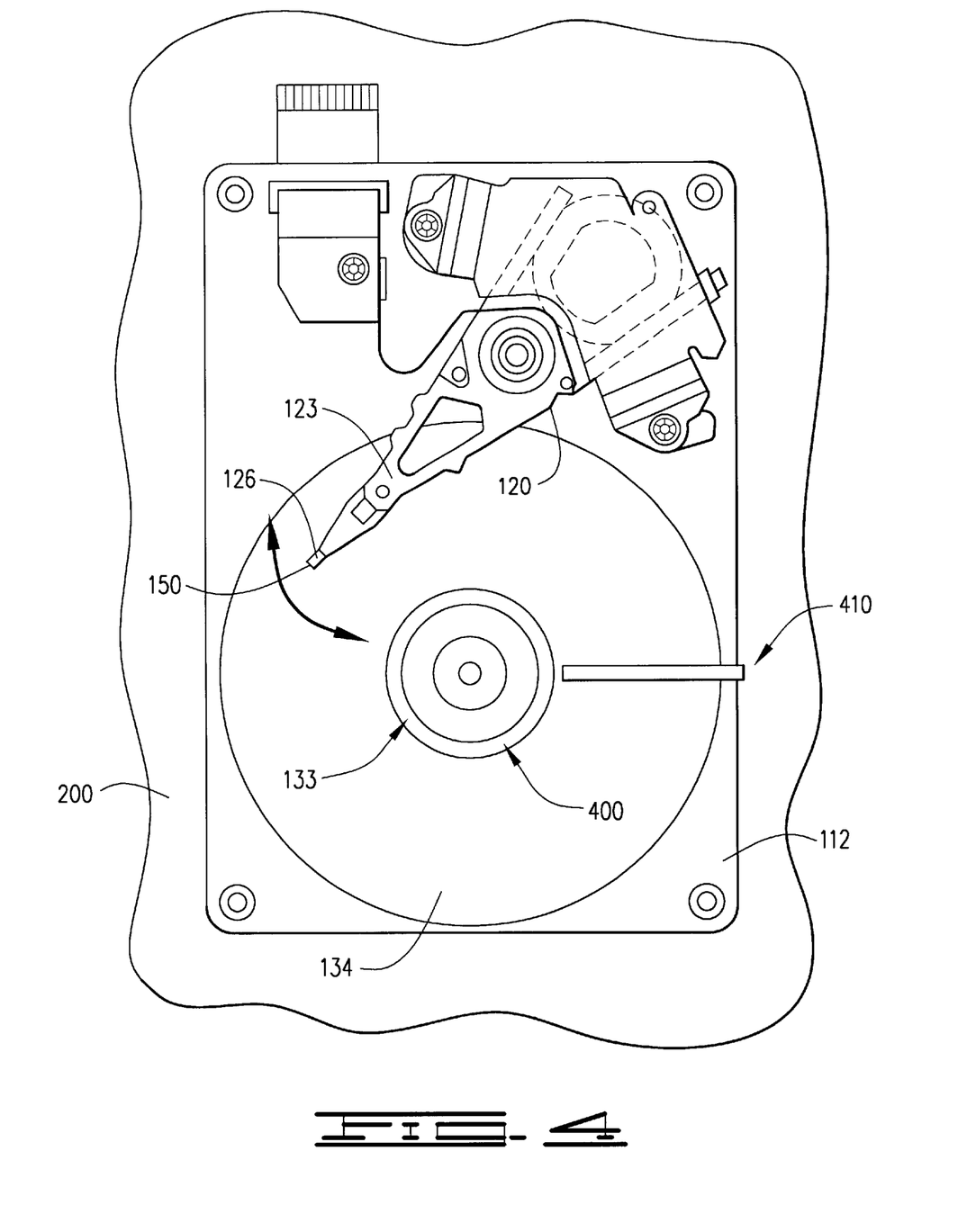
FIG. 4 is a top view of a head disc assembly positioned within a servo track writer.

FIG. 4 is a top view of a head disc assembly 152 positioned within a servo track writer 200. The head disc assembly 152 shown in FIG. 4 is for a disc drive 100 which is different than the disc drive from FIG. 1. It should be noted that a servo writer 200 can be used to write servo track to the disc drives. The head disc assembly 152 shown in FIG. 4 includes at least one disc 134 and an actuator 120.

The actuator 120 includes arms 123 which carry sliders 126. A transducer head 150 is positioned within the slider 126. The disc 134 is placed on the hub 133. The hub is placed on a spindle which is essentially a shaft about which the hub 133 rotates. A spindle bearing (not shown) is positioned between the spindle or shaft and the hub 133. The disc or discs are clamped to the hub with a disc clamp 400. The disc clamp 400 is annular and fits over the top of the hub 133. Tile servo writer 200 includes a displacement sensor 410. The displacement sensor 410 measures the displacement of the hub 133 during its rotation. The displacement sensor 410 is positioned near the hub 133 and more specifically near the disc clamp 400. The displacement sensor 410 can be any of a number of types of displacement sensors including a capacity probe, eddy current probe or laser interferometer. The displacement sensor 410 is used to gather data regarding displacement of the hub 133 during its rotation. In this particular invention, the displacement sensor is used to measure and extract information regarding the frequency of the bearing cage associated with the spindle and positioned between the spindle and the hub 133.

As mentioned previously, one major contributor to the relative motion between the head and media is from the vibration spindle which is also known as the non-repeatable runout (NRRO). The NRRO is non-synchronous to the spindle rotation but is periodic. The major contributor to the NRRO is the cage rotation or ball train; thus, a periodic waveform is found. This wave will not be synchronized to the spindle but nevertheless repeats itself at intervals longer than one spindle rotation. Certain phase relationship arises between the waveform associated with the bearing cage rotation and the spindle rotation. The inventive servo track writing scheme described herein makes use of this relationship to minimize the occurrences of track squeeze and to remove the discontinuity. The servo writing method synchronizes the start of the track writing to a portion of the NRRO associated with the bearing cage frequency such that a closure can be made at the end of the track write.

The spindle NRRO is composed of mostly low frequency components generated by the ball bearing of the spindle or hub 133. The largest single component of spindle NRRO is the cage frequency. Typically, the cage frequency is approximately 60% of spindle rotational frequency. During the process of servo track writing, the spindle NRRO has two aspect effects on track misregistration (TMR). The two aspect effects are track-to-track squeeze and repeatable runout. Assuming the magnitude of NRRO at the cage frequency is 1 microinch, under the worst case, the track-to-track squeeze will be 2 microinches as shown in FIG. 5.

Figure 5:
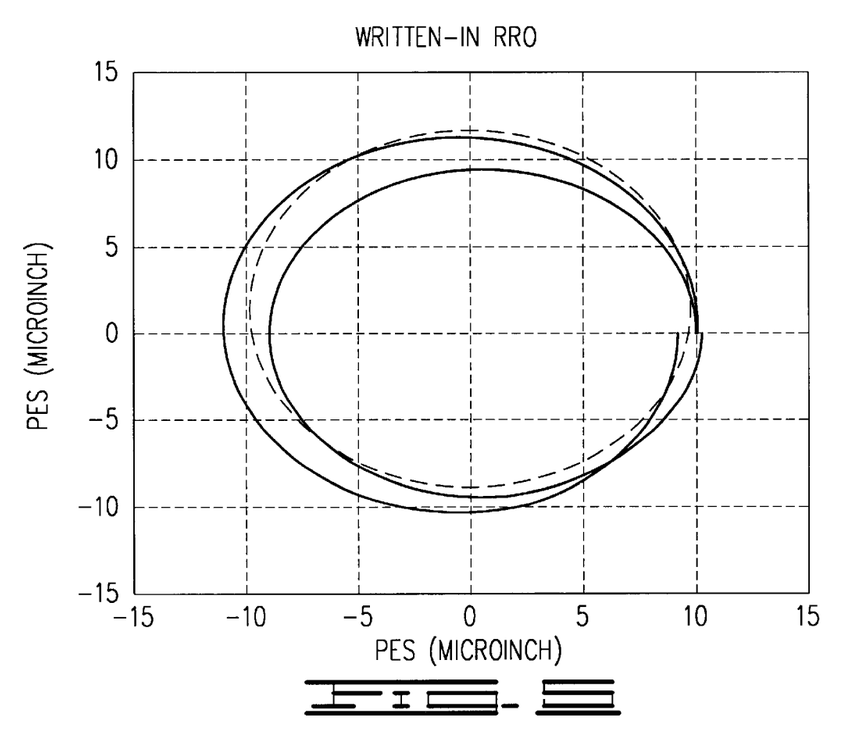
FIG. 5 is a chart illustrating the track-to-track squeeze due to the cage frequency component.
Figure 6:
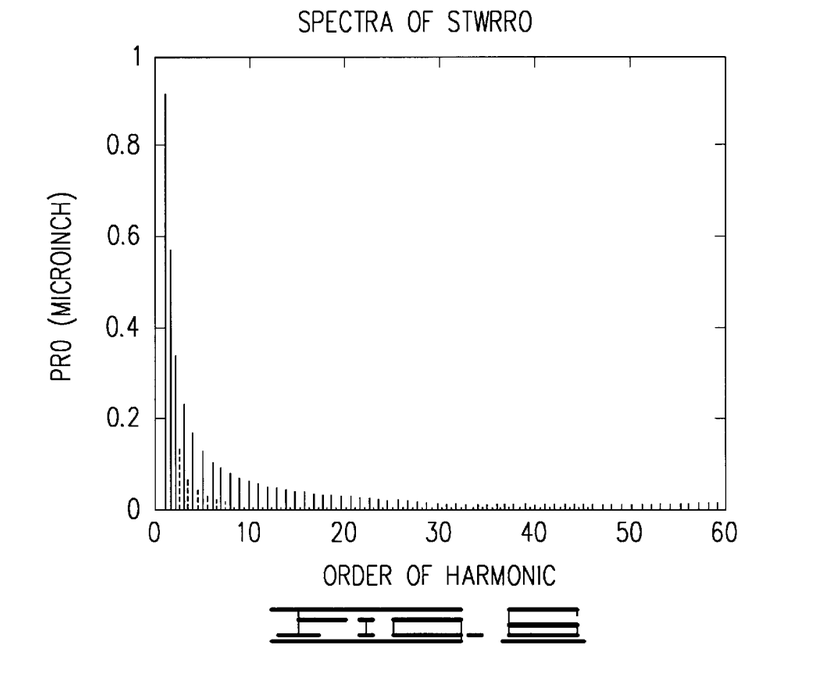
FIG. 6 is a graph which illustrates the spectra of the servo track writer repeatable run out.

FIG. 5 shows the track-to-track squeeze due to cage frequency of the spindle bearing cage. In FIG. 5, the dashed line is the perfect track or a circular track. The solid lines show the real track when the phase of the spindle bearing frequency equals 0° and 180°, respectively. The repeatable runout that is induced by the spindle bearing cage at the cage frequency can vary considerably. The spectra or variation at various harmonics of the servo track writer repeatable runout is shown in FIG. 6. As shown in FIG. 6, the solid line at a particular harmonic is the magnitude of the repeatable runout under the worst case condition, while the dotted line is the repeatable runout in microinches under the best condition. It can be seen from FIG. 6 that the magnitude of the repeatable runout is very large in the first through fifth harmonic. The magnitude or the spectrum of the various repeatable runouts associated with the spindle bearing cage varies with the starting point or phase of the cage frequency component during servo track writing. This is illustrated in FIG. 7.

Figure 7:
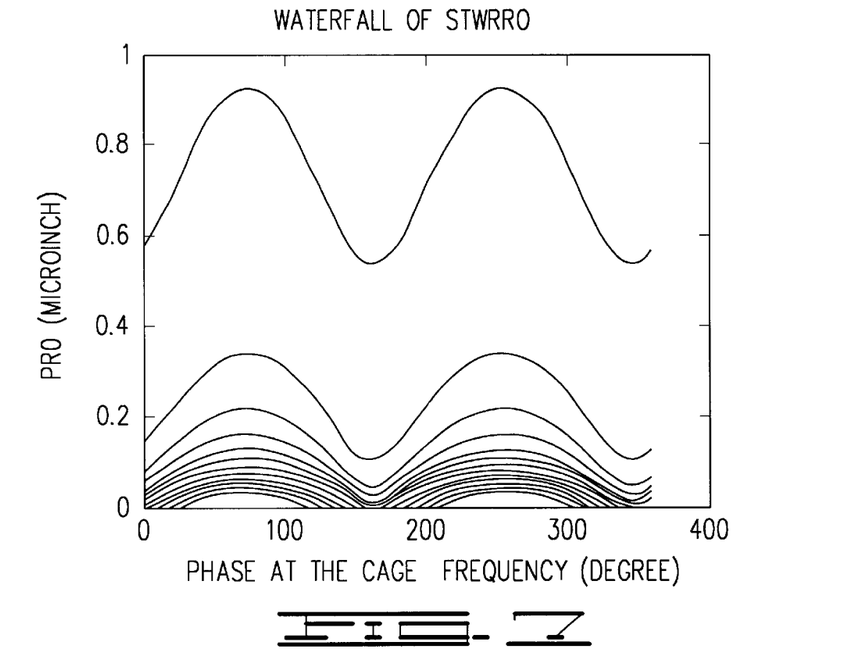
FIG. 7 is a graph illustrating how the various spectra translates into repeatable run out and how the run out varies as a result of phase.

In FIG. 7, the horizontal axis is the phase of the cage frequency and the vertical axis is the magnitude of RRO, the curves represent the different harmonic components. There is a great difference between worst condition and best condition, especially the higher harmonic components. For example, the magnitude of the first harmonic component under the worst condition is approximately two times greater than that under the best condition. And the magnitude of the second harmonic component under the worst condition is approximately 3.5 times greater than that under the best condition. The magnitude difference between the worst and best condition will enlarge with the increment of the harmonic order.

Figure 8:
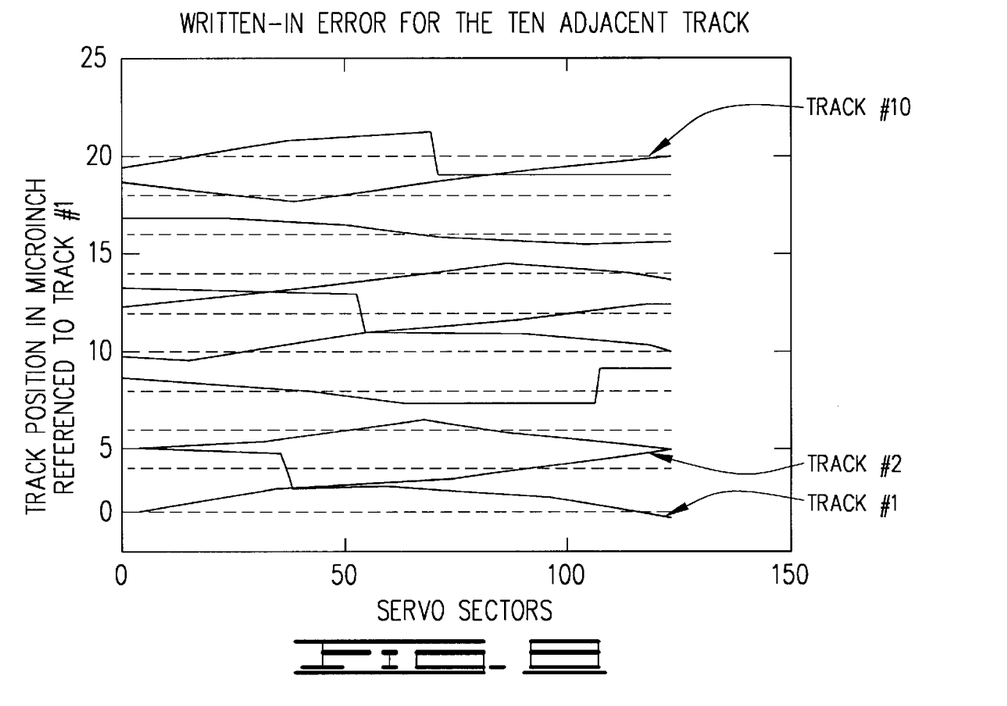
FIG. 8 is a graph illustrating the track-to-track squeeze and discontinuity due to the cage frequency component when only the spindle frequency is synchronized to the servo writer.

FIG. 8 is a graph illustrating the track-to-track squeeze and discontinuity due to the cage frequency component when only the spindle frequency is synchronized to the servo writer. Only synchronizing the spindle frequency to the servo writer is the present practice in servo track writing. FIG. 8 is an example of when the magnitude of the non-repeatable runout (NRRO) at the cage frequency is one microinch. As illustrated in FIG. 8, the dashed lines are the perfect tracks the servo writer 200 is attempting to form and the solid lines are the real tracks as written. As shown in FIG. 8, the amount of squeeze can be as high as 2× of the NRRO. Numerous discontinuities also exist in the track. The discontinuities appear as abrupt jumps in the solid lines in FIG. 8

Figure 9:
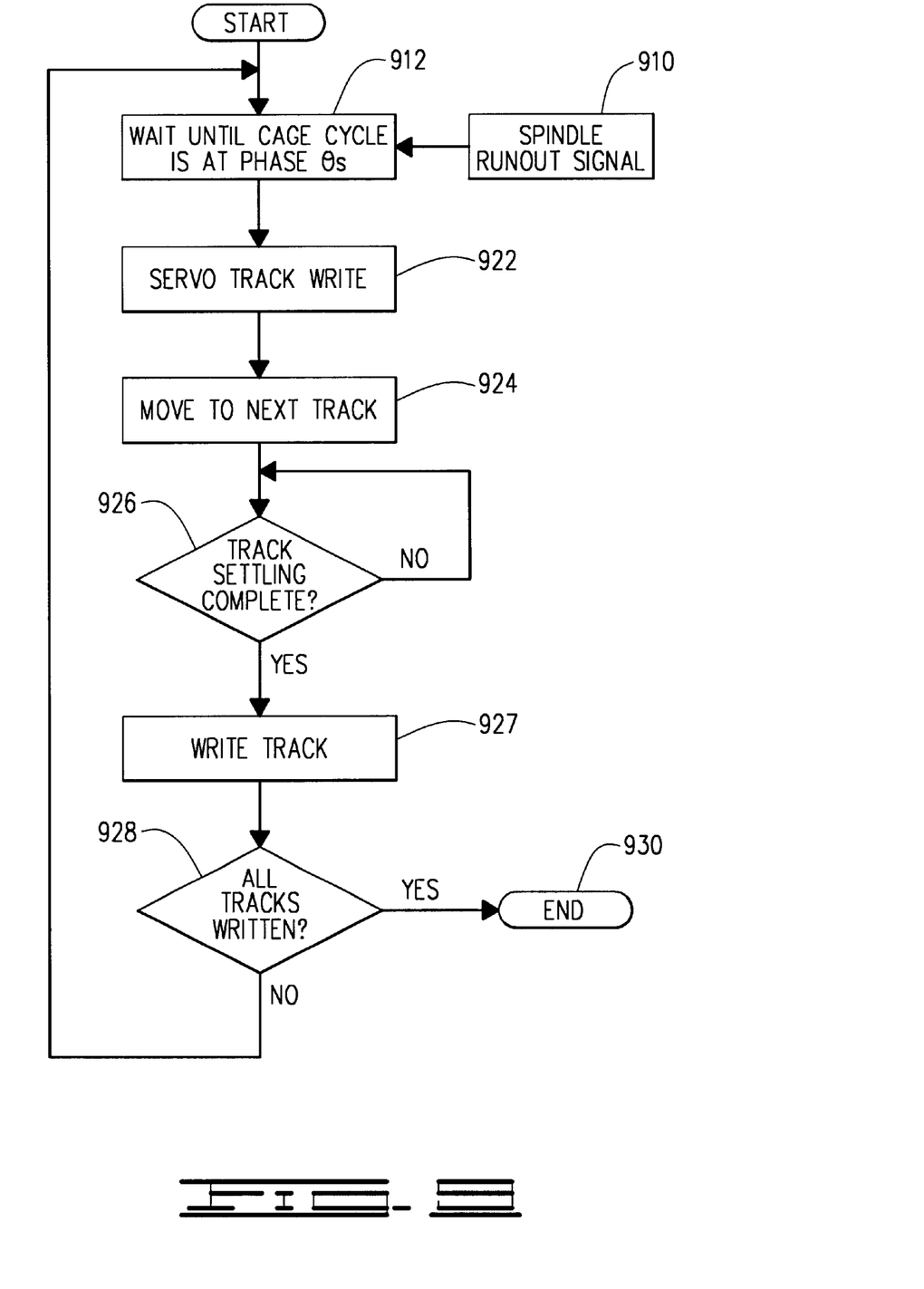
FIG. 9 is a flow diagram of the procedure for synchronizing the servo track write to the cage frequency of the spindle bearing.

In order to improve the track registration and remove discontinuities resulting from servo track writing, the servo track write is started at a selected phase of the runout of the spindle cage frequency. In other words, the write timing is synchronized to the cage rotation to reduce the written-in repeatable runout. FIG. 9 is a flow diagram of the procedure for synchronizing the servo track write to the cage frequency of the spindle bearing. The first step in the process, depicted by reference numeral 910, is to collect the spindle runout signal X. The spindle runout signal is collected by the displacement sensor 410 of the servo writer. Once the displacement data in the form of a signal is obtained, the next step 912 is to wait until the cage cycle is at θs. θs is predetermined by $$\theta_s = \left(\frac{3}{2} - \frac{fc}{fs}\right) \cdot \pi \qquad (1)$$

where fc=cage frequency and fs=spindle frequency. Then the servo track write starts, as depicted by reference number 922.

Once a servo track is written the servo writer moves the actuator to the next track position as depicted by reference numeral 924. If track settling is complete as indicated by decision box 926, the next track is written as depicted by reference numeral 927. If track settling is not complete, another period of waiting is taken and then the determination as to whether track settling is complete is made once again. After writing the next track as depicted by reference numeral 927, the servo writer determines if all tracks are written, as depicted by reference numeral 928. If all tracks are written, the servo writer completes or ends the task that is affected by reference numeral 930. If all tracks are not written, the process returns to step 912 where the spindle runout signal is monitored until the cage cycle is at θs.

Figure 10:
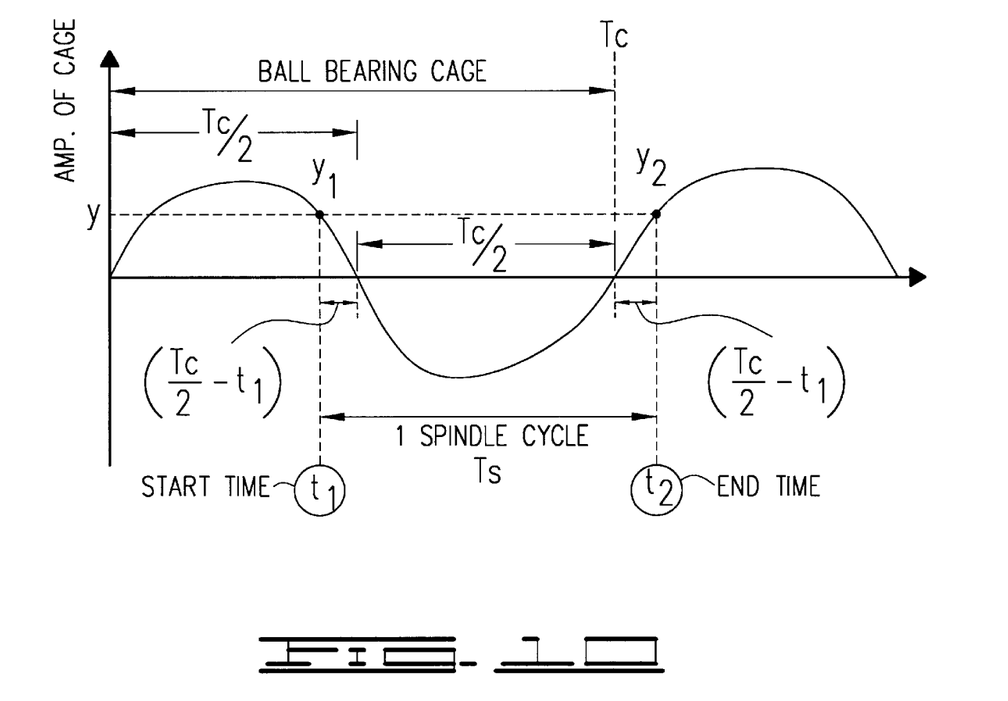
FIG. 10 is a diagram showing the cage frequency and the spindle cycle and various times associated with deriving θs.

FIG. 10 shows a diagram of the cage cycle. The x axis is time. The y axis is the amplitude of the cage cycle. Referring now to FIG. 10, the expression $$\theta_s = \left(\frac{3}{2} - \frac{fc}{fs}\right) \cdot \pi \tag{1}$$

which was used in the method discussed with reference to FIG. 9, will be derived.

Because of the mechanical interface between a spindle and a bearing $$\text{set, it is assumed that } Ys > Yc/2 \tag{2}$$

where Ys=time period for one spindle cycle and

Yc=time period for one cage cycle.

Formula 2 above holds for a typical bearing.

The time period for one spindle cycle is set forth by the expression below:

$$t_2 - t_1 = Ys \text{ (time period for 1 spindle cycle)} \tag{3}$$

For example, a spindle speed of 90 Hz, Ys=0.011 seconds. For $y_2 = y$, on the cage cycle the following holds:

$$Ts = \left(\frac{Tc}{2} - t_1\right) + \frac{Tc}{2} + \left(\frac{Tc}{2} - t_1\right) \tag{4}$$

$$Ts = \frac{3}{2}Tc - 2t_1 \tag{5}$$

Solving expression (5) for $t_1$ yields:

$$t_1 = \frac{1}{2}\left(\frac{3Tc}{2} - Ts\right) \tag{6}$$

To find θs (the phase when to start writing servo track), on the cage frequency cycle $$\theta_s = \frac{t_1}{Tc}(2T\pi) \text{ (by definition of phase)} \tag{7}$$

now substituting expression (6), which defines $t_1$, into expression (7), it yields $$\theta_s = \frac{1}{2}\left(\frac{3Tc}{2} - Ts\right)\frac{1}{Tc} \cdot 2\pi \tag{8}$$

simplifying equation (8) yields $$\theta_s = \left(\frac{3}{2} - \frac{Ts}{Tc}\right)\pi \text{ (in radians)} \tag{9}$$

As is well known, the time period of a cycle is equal to the inverse of the frequency for that cycle. Therefore, $$Ys = 1 \text{ spindle cycle (sec)} = \tag{10}$$

$$\frac{1}{fs}$$

$$Yc = 1 \text{ cage cycle (sec)} = \tag{11}$$

$$\frac{1}{fc}$$

or substituting (10) and (11) into equation (9), yields equation 1 which is repeated $$\theta_s = \left(\frac{3}{2} - \frac{fc}{fs}\right)\pi \tag{1}$$

Figure 11:
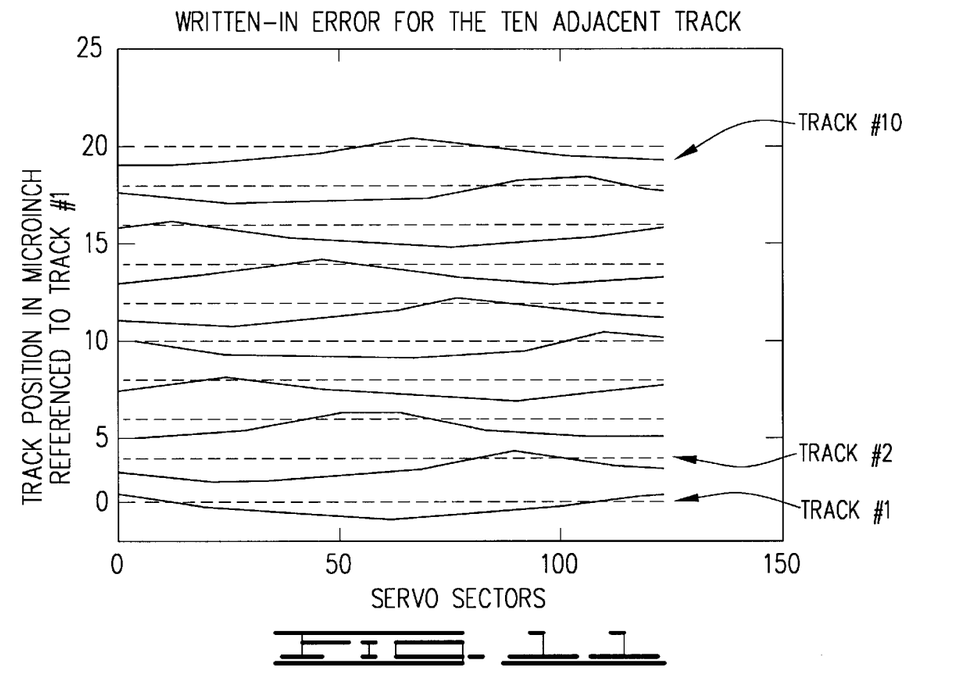
FIG. 11 is a graph illustrating the track-to-track squeeze due to the cage frequency component when only the cage frequency is synchronized to the servo writer

The result of the procedures discussed are reflected in the graph of FIG. 11. FIG. 11 is a graph illustrating a track-to-track squeeze due to the cage frequency component when only the cage frequency is synchronized to the servo writer 200. The track-to-track squeeze generated by the cage frequency component is shown in FIG. 11. In FIG. 11, it is assumed that the magnitude of the nonrepeatable runout at the cage frequency is 1 microinch. Under the worst case, the track-to-track squeeze will be about 1 microinch, that is to say that the cage frequency amplitude is only half of the current condition. Furthermore, discontinuities have been removed from the tracks as written, when compared to the perfect track. As you will recall, the perfect track is represented by the dotted lines while the actual written track is shown in solid lines.

Figure 12:
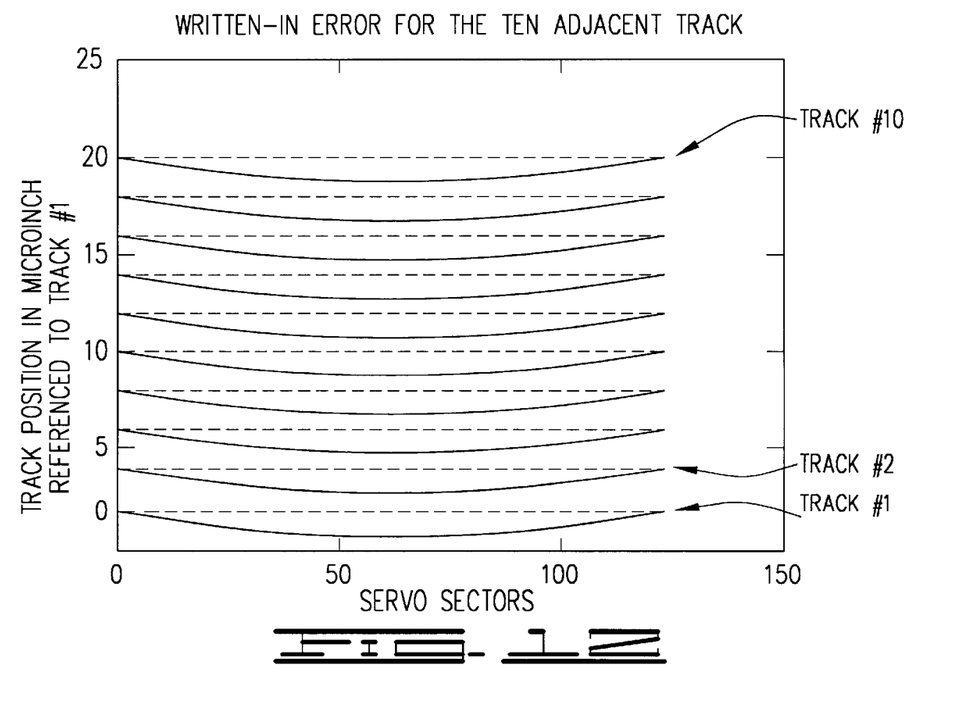
FIG. 12 is a graph illustrating the track-to-track squeeze due to the cage frequency component when both the cage frequency and the spindle. frequency are synchronized to the servo writer.

In FIG. 12, further improvements in the track-to-track squeeze and the elimination of discontinuities is shown. FIG. 12 is a graph illustrating the absence of the track-to-track squeeze due to the cage frequency component when both the cage frequency and the spindle frequency are synchronized to the servo writer 200. The track-to-track spacing as shown in FIG. 12 when both the cage frequency and the spindle rotation frequency are synched to the servo track writer reveals that squeeze is further lessened or almost eliminated. In addition, the discontinuities are all but removed. Each track is laid out synchronous to each other, farther improving the written-in repeatable runout. It should be noted that such a scheme will increase the write time approximately 10 times to that of the current servo track writing time. It should be noted that if both the cage frequency and the spindle rotation frequency are synched to the servo track writer that the throughput time for writing servo to HDAs 152 will be greatly reduced.

Figure 13:
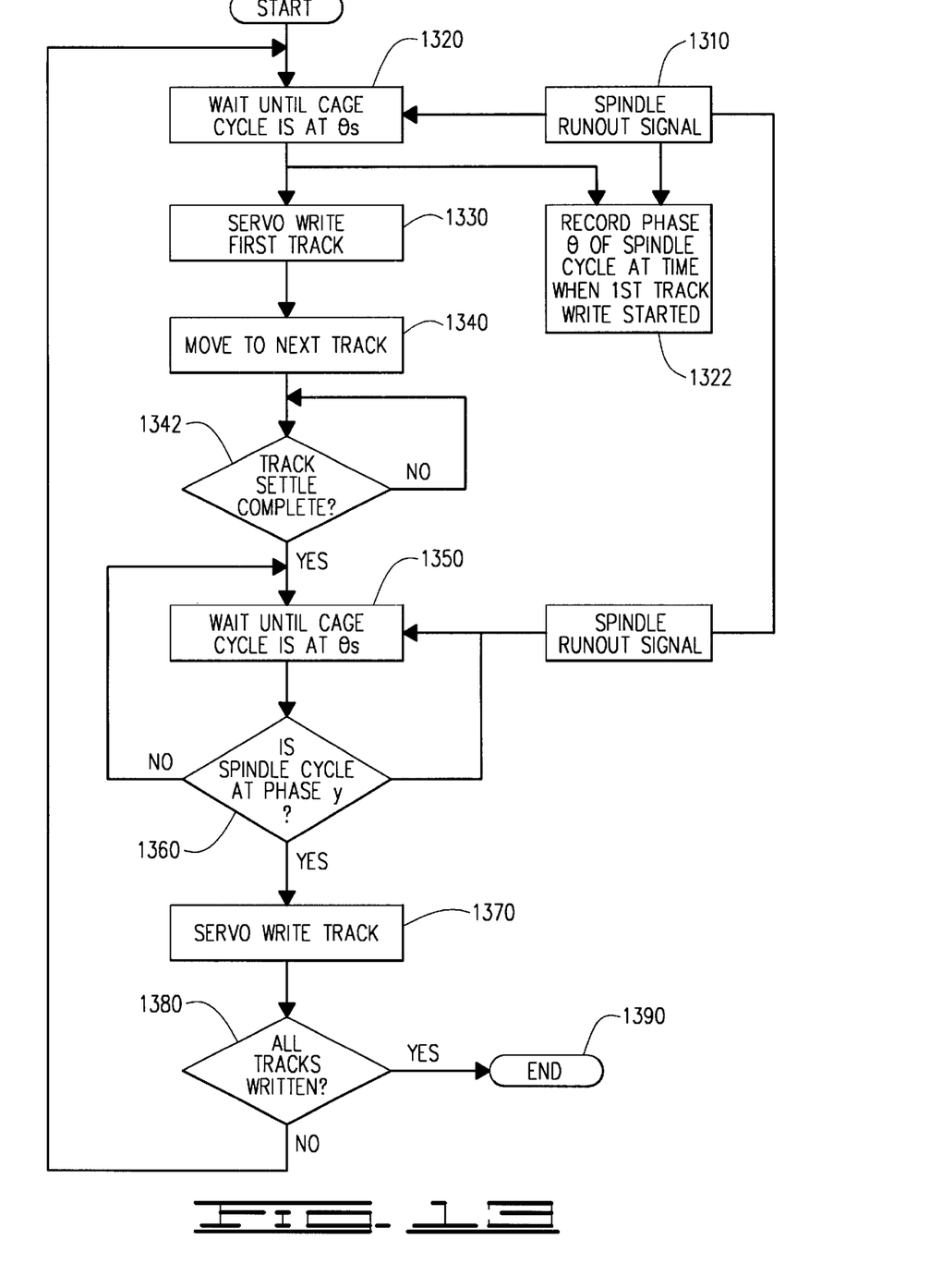
FIG. 13 is a flow diagram of the procedure for synchronizing the servo write to both the cage frequency and the spindle frequency.

FIG. 13 is a flow diagram of the procedure for synchronizing the servo write to both the cage frequency and the spindle frequency 1300. As depicted by step 1310 the spindle runout signal is monitored until the cage cycle is at $\theta_S$, as depicted by step 1320. When the cage frequency is at $\theta_S$ the servo write of the first track is started as depicted by step 1330. The phase Φ of the spindle cycle at the time when the first track write is started is also recorded as depicted by step 1322. Once the servo write of the first track is completed, the actuator moves the transducer to the next track, as depicted by step 1340. The next step is to determine if the track settle is completed after the seek to the next track, as depicted by step 1342. If not, the track settle step 1342 is repeated. If the track settle is completed, the spindle runout signal is monitored once again until the cage cycle is at $\theta_S$, as depicted by step 1350. Next, the spindle runout signal is monitored to determine if the spindle cycle is at phase Φ, as depicted by decision box 1360. If the spindle cycle is not at phase Φ, step 1350 and 1360 are repeated. If the spindle cycle is at phase Φ, the track is servo written, as depicted by step 1370. The next portion of the process includes a determination as to whether all tracks are servo written, as depicted in decision box 1380. If all the tracks are written, the process ends, as depicted by reference number 1390. If all the tracks are not written, the actuator is moved to the next track as depicted by step 1340. Steps 1342 to 1380 are then repeated until the process ends as depicted by 1390.

It should be noted that the single largest component of servo track writer repeatable runout is the spindle cage frequency component. Thus, it can be seen that by synchronizing the cage frequency at the optimum starting phase to perform servo track writing not only improves the track-to-track squeeze but also improves the written-in repeatable runout.

Advantageously, the method and apparatus of the present invention produces disc drives with higher storage capacity than those drives produced by other servo writing methods/apparatuses. In particular, the instant invention permits precise, concentric writing of servo information to the disc. This reduces the servo track written repeatable run out and reduces the overall TMR budget so that tracks may be more closely spaced. Allowing tracks to be more closely spaced allows for the higher storage capacity of the disc drive. Advantageously, the method and apparatus reduce non-repeatable run out using current manufacturing apparatus and methods.

Conclusion

In conclusion, a servo track writer 200 for writing servo information to a head disc assembly 152 includes a mounting fixture 202 for mounting a head disc assembly 152. The head disc assembly 152 includes a disc 134 attached to a base 112 with a spindle bearing, and a rotary actuator 120 adjacent the disc 134. The actuator 120 includes a read/write head 150 for selectively magnetizing the disc. The mounting fixture 202 provides a mechanical reference for the servo track writer 200 as servo information is written to the head disc assembly 152. The servo track writer 200 also includes a pusher block assembly 204 mounted to the mounting fixture 202 proximate the actuator of the head disc assembly 152. The pusher block assembly 204 mechanically positions the actuator 120. The servo track writer 200 also includes a position control system 206 for controlling the position of the actuator. The position control system 206 further includes a motor connected to the pusher block assembly 204, and a controller 212 for outputting control signals to the motor in order to adjust the position of the actuator 120 with respect to the disc 134. The controller 212 synchronizes the motion of the actuator 120 to a cage frequency of the spindle bearing. The position control system may further have a sensor 410 for monitoring the cage frequency of the spindle bearing of the head disc assembly.

The controller 212 selects the time to start servo writing in response to the cage frequency of the spindle bearing. The position control system of the servo track writer may also include a detector 410 for determining the position of the actuator 120 and outputting control signals to the motor in order to adjust the position of the actuator 120 in response to the detected position of the actuator and a desired position of the actuator, The controller 212 for outputting control signals to the motor may synchronize to the spindle rotation frequency in addition to the spindle bearing cage frequency. The servo track writer 200 may also have a sensor 410 for monitoring the cage frequency of the spindle bearing of the head disc assembly 134. The servo track writer 200 which synchs to both the spindle rotation frequency and the spindle bearing cage frequency may also have a sensor 410 for monitoring the cage frequency of the spindle bearing of the head disc assembly 134. The controller 212 selects the time to start servo writing in response to the cage frequency of the spindle bearing. The servo track writer 200 further includes a detector 410 for determining the position of the actuator 120 and outputting control signals to the motor in order to adjust the position of the actuator 120 in response to the detected position of the actuator and a desired position of the actuator 120.

Also disclosed is a method for writing servo patterns to a disc drive which includes at least one disc mounted on a spindle 133 with a spindle bearing, the at least one disc 134 mounted for rotation about an axis. The disc drive also includes an actuator 120 for moving each of at least one transducer relative to an associated at least one disc 134. The transducer 126 reads and writes information to the associated disc 134. The servo writer 200 includes a linkage for controllably moving the actuator 120 during servo writing. The method for writing servo patterns includes monitoring spindle run out data 910, and moving the linkage of the servo writer to synchronize movement of the actuator to the spindle bearing cage frequency. The step of moving the linkage of the servo writer 200 to synchronize movement of the actuator 120 to the spindle bearing cage frequency may still further include hiring the initial movement of the linkage of the servo Writer 200 to start the servo write process based on the phase of the spindle bearing cage frequency. The timing step may be based on measuring the phase at the spindle cage frequency 918. The step of timing the initial movement of the linkage of the servo writer to start the servo write process based on the phase of the spindle bearing cage may be selected so that the spindle bearing cage frequency is at the minimum.

The method for writing servo patterns to a disc drive may further comprise the step of determining a spindle frequency, and using the spindle frequency in addition to the bearing cage frequency 912 to synchronize movement of the actuator 120 the spindle bearing cage frequency and to synchronize movement to the spindle frequency. The step of moving the linkage 200 of the servo writer to synchronize movement of the actuator 120 the spindle bearing cage frequency may also include timing the initial movement of the linkage of the servo writer 200 to start the servo write process based on the phase of the spindle bearing cage frequency.

Most generally, a servo track writer 200 for writing servo information to a head disc assembly 134 is disclosed which includes a position control system for controlling the position of the actuator. The head disc assembly 152 includes a disc attached to a base 112 with a spindle bearing, and a rotary actuator 120 adjacent the disc 134. The actuator 120 includes a read/write head 120 for selectively magnetizing the disc 134. The servo track writer 200 includes a motor connected to a pusher block assembly 204, and a device for moving the pusher block 204 in synch with the motion of the spindle bearing.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A servo track writer for writing servo information to a head disc assembly, the head disc assembly including a disc attached to a base with a spindle bearing, and a rotary actuator adjacent the disc, the actuator including a read/write head for selectively magnetizing the disc, the servo track writer comprising:

a mounting fixture for mounting the head disc assembly, the mounting fixture providing a mechanical reference for the servo track writer as servo information is written to the head disc assembly;

a pusher block assembly, mounted to the mounting fixture proximate the actuator of the bead disc assembly, for mechanically positioning the actuator; and a position control system for controlling the position of the actuator, the position control system further comprising:

a motor connected to the pusher block assembly; and a controller for outputting control signals to the motor in order to adjust the position of the actuator with respect to the disc, the controller synchronizing the motion of the actuator to a cage frequency of the spindle bearing.

2. The servo track writer of claim 1 wherein the position control system further comprises a sensor for monitoring the cage frequency of the spindle bearing of the head disc assembly.

3. The servo track writer of claim 1 wherein the position control system further comprises a sensor for monitoring the cage frequency of the spindle bearing of the head disc assembly, said controller selecting the time to start servo writing in response to the cage frequency of the spindle berg.

4. The servo track writer of claim 3 wherein the position control system further comprises a detector for determining the position of the actuator and outputting control signals to the motor in order to adjust the position of the actuator in response to the detected position of the actuator and a desired position of the actuator.

5. The servo track writer of claim 1 wherein the controller for outputting control signals to the motor also synchronizes to the spindle rotation frequency.

6. The servo track writer of claim 5 wherein the position control system further comprises a sensor for monitoring the cage frequency of the spindle bearing of the head disc assembly.

7. The servo track writer of claim 5 wherein the position control system further comprises a sensor for monitoring the cage frequency of the spindle bearing of the head disc assembly, said controller selecting the time to start servo writing in response to the cage frequency of the spindle bearing.

8. The servo track writer of claim 7 wherein the position control system further comprises a detector for determining the position of the actuator and outputting control signals to the motor in order to adjust the position of the actuator in response to the detected position of the actuator and a desired position of the actuator.

9. A method for writing servo patterns to a disc drive which includes at least one disc mounted on a spindle with a spindle bearing, the at least one disc mounted for rotation about an axis, the disc drive also including an actuator for moving each of at least one transducer relative to an associated at least one disc, the at least one transducer for reading and writing information to the associated disc, the servo writer including a linkage for controllably moving the actuator during servo writing, said method comprising steps of:

(a) collecting spindle run out data;

(b) determining a spindle bearing cage frequency from the collected data; and (c) moving the linkage of the servo writer to synchronize movement of the actuator to the spindle bearing cage frequency.

10. The method for writing servo patterns to a disc drive as recited in claim 9 wherein the determining step (b) further comprises a step (b)(i) of calculating the spindle bearing cage frequency.

11. The method for writing servo patterns to a disc drive as recited in claim 10 wherein the moving step (c) further comprises:

(c)(i) generating run out at the spindle bearing cage frequency; and (c)(ii) calculating the phase of the spindle bearing cage frequency.

12. The method for writing servo patterns to a disc drive as recited in claim 11 wherein the moving step (c) further comprises:

(c)(iii) timing the initial movement of the linkage of the servo writer to start the servo write process based on the phase of the spindle bearing cage frequency.

13. The method for writing servo patterns to a disc drive as recited in claim 12 wherein the timing top (c)(iii) is based on measuring the phase at the spindle cage frequency.

14. The method for writing servo patterns to a disc drive as recited in claim 11 wherein the moving step (e) further comprises:

(c)(iii) timing the initial movement of the linkage of the servo writer to start the servo write process based on the phase of the spindle bearing cage frequency being at the minimum.

15. The method for writing servo patterns to a disc drive as recited in claim 9 further comprising the step of (d) determining a spindle frequency, and wherein the moving step (c) further comprises moving the linkage of the servo writer to synchronize movement of the actuator the spindle bearing cage frequency and to synchronize movement to the spindle frequency.

16. The method for writing servo patterns to a disc drive as recited in claim 15 wherein the determining step (b) further comprises a step (b)(i) of calculating the spindle bearing cage frequency.

17. The method for writing servo patterns to a disc drive as recited in claim 16 wherein the moving step (c) further comprises:

(c)(i) generating run out at the spindle bearing cage frequency; and (c)(ii) calculating the phase of the spindle bearing cage frequency.

18. The method for writing servo patterns to a disc drive as recited in claim 17 wherein the moving step (c) further comprises:

(c)(iii) timing the initial movement of the linkage of the servo writer to start the servo write process based on the phase of the spindle bearing cage frequency.

19. A servo track writer for writing servo information to a head disc assembly, the head disc assembly including a disc attached to a base with a spindle bearing, and a rotary actuator adjacent the disc, the actuator including a read/write head for selectively magnetizing the disc, the servo track writer including a position control system for controlling the position of the actuator, the position control system further comprising:

a motor connected to a pusher block assembly; and means for moving the pusher block in synch with the motion of the spindle bearing.

* * * * *